US007309684B2

(12) United States Patent
Filippini et al.

(10) Patent No.: US 7,309,684 B2
(45) Date of Patent: Dec. 18, 2007

(54) OIL-IN-WATER EMULSIFIED REMOVER COMPRISING AN ETHOXYLATED ALCOHOL SURFACTANT

(75) Inventors: Brian B. Filippini, Mentor-on-the Lake, OH (US); Christopher M. Carter, Chardon, OH (US); Harshida C. Dave, Highland Heights, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 83 days.

(21) Appl. No.: 11/127,631

(22) Filed: May 12, 2005

(65) Prior Publication Data

US 2006/0258555 A1 Nov. 16, 2006

(51) Int. Cl.
C11D 1/72 (2006.01)
C11D 3/43 (2006.01)
C11D 3/08 (2006.01)

(52) U.S. Cl. ............ 510/201; 510/174; 510/185; 510/207; 510/245; 510/365; 510/421; 510/417; 510/432; 510/407; 510/485; 510/507; 510/342; 510/334

(58) Field of Classification Search .......... 510/174, 510/201, 185, 207, 245, 365, 421, 417, 432, 510/407, 485, 507, 342, 334
See application file for complete search history.

(56) References Cited

U.S. PATENT DOCUMENTS

| 4,234,435 | A | | 11/1980 | Meinhardt et al. ...... 252/51.5 A |
| 4,237,910 | A | * | 12/1980 | Khahil et al. ................ 132/202 |
| 4,447,348 | A | | 5/1984 | Forsberg ....................... 252/75 |
| 4,448,703 | A | | 5/1984 | Forsberg ....................... 252/75 |
| 4,708,753 | A | | 11/1987 | Forsberg ......................... 149/2 |
| 4,749,500 | A | | 6/1988 | Forsberg et al. ........... 252/49.3 |
| 4,826,618 | A | | 5/1989 | Borseth et al. ......... 252/174.21 |
| 5,019,138 | A | | 5/1991 | Farrah et al. ................... 55/89 |
| 5,084,263 | A | | 1/1992 | McCoy et al. .............. 423/413 |
| 5,108,614 | A | * | 4/1992 | Loth et al. .................. 510/238 |
| 5,230,714 | A | | 7/1993 | Steckel ........................ 44/432 |
| 5,246,503 | A | | 9/1993 | Minick ........................ 134/38 |
| 5,443,748 | A | | 8/1995 | Bergishagen et al. ....... 252/162 |
| 5,518,661 | A | | 5/1996 | Langford et al. ........... 252/364 |
| 5,554,320 | A | * | 9/1996 | Yianakopoulos ....... 252/389.23 |
| 5,569,410 | A | | 10/1996 | Distaso ........................ 510/202 |
| 5,605,579 | A | | 2/1997 | Distaso ........................ 134/38 |
| 5,700,331 | A | * | 12/1997 | Thomas et al. ............... 134/29 |
| 5,726,140 | A | | 3/1998 | Distaso ........................ 510/207 |
| 5,728,393 | A | * | 3/1998 | Soudant et al. ............. 424/401 |
| 5,821,209 | A | | 10/1998 | Distaso et al. .............. 510/207 |
| 5,851,972 | A | | 12/1998 | Distaso et al. .............. 510/206 |
| 5,854,188 | A | | 12/1998 | Distaso et al. .............. 510/206 |
| 5,911,838 | A | | 6/1999 | Barnett ........................ 134/38 |
| 6,013,270 | A | * | 1/2000 | Hargraves et al. .......... 424/401 |
| 6,130,192 | A | | 10/2000 | Vitomir ....................... 510/202 |
| 6,153,573 | A | | 11/2000 | Reynolds .................... 510/203 |
| 6,159,925 | A | * | 12/2000 | Blandiaux ................... 510/437 |
| 6,162,776 | A | | 12/2000 | Marquis et al. ............. 510/201 |
| 6,169,061 | B1 | | 1/2001 | Machac, Jr. et al. ........ 510/201 |
| 6,174,847 | B1 | | 1/2001 | Lallier ......................... 510/203 |
| 6,264,961 | B1 | * | 7/2001 | Ansmann et al. ........... 424/401 |
| 6,303,552 | B1 | | 10/2001 | Vitomir ....................... 510/202 |
| 6,328,984 | B1 | * | 12/2001 | Katsuyama ................. 424/401 |
| 6,348,107 | B1 | | 2/2002 | Whitton et al. ............... 134/38 |
| 6,362,155 | B1 | * | 3/2002 | Kinscherf ................... 510/417 |
| 6,369,009 | B1 | | 4/2002 | Machac, Jr. et al. ........ 510/201 |
| 6,395,103 | B1 | | 5/2002 | Machac, Jr. et al. .......... 134/40 |
| 6,468,952 | B1 | | 10/2002 | Reynolds .................... 510/203 |
| 6,479,445 | B1 | | 11/2002 | Machac, Jr. et al. |
| 6,482,270 | B1 | | 11/2002 | Machac, Jr. et al. .......... 134/38 |
| 6,624,222 | B2 | | 9/2003 | Kestyn et al. ............... 524/314 |
| 6,824,623 | B1 | | 11/2004 | Gross et al. ................. 134/36 |
| 2004/0058839 | A1 | | 3/2004 | Tadrowski et al. .......... 510/421 |

FOREIGN PATENT DOCUMENTS

| CH | 344079 | | 1/1960 |
| DE | 1145892 | | 3/1963 |
| DE | 2910452 A1 | | 9/1980 |
| EP | 0196162 A2 | | 10/1986 |
| EP | 0196162 A3 | | 10/1986 |
| EP | 0238956 | | 3/1987 |
| EP | 0561600 A2 | | 9/1993 |
| EP | 0846736 A1 | | 6/1998 |
| EP | 0860482 | | 8/1998 |
| JP | 2002/44849 | | 2/2002 |
| WO | WO 94/23012 | | 10/1994 |
| WO | WO 95/10570 | | 4/1995 |
| WO | WO 96/04342 | | 2/1996 |
| WO | WO 97/24409 | | 7/1997 |
| WO | 99/01515 | * | 1/1999 |
| WO | WO 99/01515 | | 1/1999 |
| WO | WO 2004/081124 | | 9/2004 |

OTHER PUBLICATIONS

UK Patent Application No. GB2049721A published Dec. 31, 1980—English equivalent of DE 2910452A1.
Search Report of corresponding International Appln. No. PCT/US2006/018049 mailed Oct. 24, 2006.

* cited by examiner

Primary Examiner—Charles Boyer
(74) Attorney, Agent, or Firm—Teresan W. Gilbert; Christopher D. Hilker

(57) ABSTRACT

An oil-in-water emulsion composition remover is disclosed. The compositions comprise a solvent, water and a surfactant. The removers are useful in removing non-aqueous and aqueous coatings, waxes, greases, and the like, from substrates to which the coatings, waxes, greases, and the like, have been applied.

10 Claims, No Drawings

OIL-IN-WATER EMULSIFIED REMOVER COMPRISING AN ETHOXYLATED ALCOHOL SURFACTANT

"This application is a continuation of U.S. Ser. No. 11/127,632 filed May 12, 2005 and claims benefit of said prior application."

TECHNICAL FIELD

This invention relates to oil-in-water emulsion compositions. The compositions comprise a solvent, water, a surfactant, a thickener and a base. The compositions are useful in removing non-aqueous and aqueous coatings, waxes, greases, and the like, from substrates to which the coatings, waxes, greases, and the like, have been applied.

BACKGROUND OF THE INVENTION

Coatings removers are typically liquids that contain principally solvents, sometimes in combination with waxes or thickeners. When applied to a painted and/or coated substrate, these compositions typically soften or dissolve the paint and/or coating and bring it to such a condition that it can be easily removed. The solvents that are typically used include methylene chloride, mineral spirits, toluene, alcohols, acetone, methyl ethyl ketone and N-methylpyrrolidone. These coatings removers may be undesirable because the remover contains a solvent. Many of the solvents in the coatings removers are classified as volatile organic solvents (VOC) and as a result their use may lead to air emission problems and environmental concerns.

The present invention provides an oil-in-water emulsified remover. The oil-in-water emulsion remover tends to reduce the amount of emissions emitted as compared to non-oil-in-water emulsion coatings removers. Further, the oil-in-water emulsified remover provides desired coatings removal properties. The oil-in-water emulsified remover is also useful to remove waxes, greases, coatings and the like from substrates.

SUMMARY OF THE INVENTION

The invention relates to an oil-in-water emulsion composition, comprising:

(A) a solvent selected from the group consisting of aliphatic hydrocarbons, aromatic hydrocarbons, alcohols, ethers, esters, glycol ethers, hydrofluoroethers, ketones, aldehydes, lactones, terpenes, pyrrolidones, and mixtures of two or more thereof;

(B) water;

(C) at least one surfactant selected from the group consisting of ethoxylated alcohols, ethoxylated fatty acids, esters, ethoxylated fatty acid esters; sorbitan esters, ethoxylated sorbitan esters, ammonium carboxylate salts, metallic carboxylate salts, alkylarylsulfonates, amine oxides, ethoxylated amines and amides, ethoxylated fatty acids, ethoxylated fatty esters and oils, fatty esters, fatty acid amides, ethoxylated glycerol esters, ethoxylated glycol esters, ethylene oxide/propylene oxide co-polymers, imidazoline derivatives, lecithin and derivatives, lignin and derivatives, monoglycerides and derivatives, olefin sulfonates, phosphate esters and derivatives, alkyl sulfates, alkyl ether sulfates, sulfonates of dodecyl and tridecyl benzenes, and sulfonates of alkyl naphthalenes, sulfosuccinates and derivatives,; and mixtures thereof (D) at least one thickener selected from the group consisting of polysaccharides; glucose-mannose polysaccharides; galactose-mannose polysaccharides, gums, such as xanthan gum, cellulosics, starches, such as potato starch; silicates such as magnesium aluminum silicates; hydroxyethylcellulose; hydroxypropylcellulose; AMPS/VIFA copolymers; stearyl alcohol, cetyl alcohol, cetearyl alcohol; clays, such as hectorites, smectites and bentonites; crosslinked polyacrylic acid copolymers, modified crosslinked polyacrylate polymers; and mixtures thereof; and (E) at least one base selected from the group consisting of ammonium or alkali or alkaline earth metal hydroxide, oxide, aluminate, borate, metasilicate, acetate, carbonate or bicarbonate, such as ammonium hydroxide, sodium hydroxide, potassium hydroxide, lithium hydroxide, calcium hydroxide, sodium aluminate, sodium borate, sodium metasilicate, potassium metasilicate, sodium acetate, sodium carbonate, sodium bicarbonate, potassium carbonate and the like; alkanolamines, such as dimethylethanolamine, triethanolamine, and diethylethanolamine; polyamines, such ethylene diamine, diethylene triamine, triethylene tetramine; tetraethylene pentamine; pentaethylene hexamine, higher order polyethylene polyamines, and mixtures thereof, resulting in an emulsified remover.

The emulsified remover is useful in removing aqueous and/or non-aqueous coatings, waxes, greases and the like from substrates such material is applied to.

The Oil in Water Emulsion Composition

The oil-in-water emulsion remover comprises (A) solvent(s), (B) water, (C) surfactant(s), (D) thickening agent(s), (E) base(s) and optionally additional additives as desired, including antimisting agents, odor masks, corrosion inhibitors, coloring agents, antifungal agents, antimicrobial agents, corrosion inhibitors, antifreeze agents, and the like.

The emulsions are characterized by a continuous aqueous phase, and a discontinuous oil or solvent phase. Throughout the specification and in the claims the term "oil" (as in oil-in-water emulsion) is used to refer to the organic phase of the emulsion. In one embodiment, the oil-in-water emulsion composition is characterized by a dispersed organic phase comprising droplets having a mean diameter of about 0.05 to about 50 microns, and in one embodiment about 0.05 to about 30 microns, and in one embodiment about 0.05 to about 10 microns, and in one embodiment about 0.1 to about 10 microns, and in one embodiment, 0.2 to about 10 microns, and in one embodiment about 0.3 to about 10 microns, and in one embodiment about 0.5 to about 7 microns, and in one embodiment about 0.5 to about 5 microns.

The Brookfield viscosity of the oil-in-water emulsion composition using a No. 3 spindle at 10 rpm may be up to about 100,000 centipose (cP) at 25° C., and in one embodiment from about 5 to about 50,000 cP at 25° C., and in one embodiment from about 10 to about 10,000 cP at 25° C.

The Solvent (A)

The solvent (A) includes aliphatic hydrocarbons, aromatic hydrocarbons, alcohols, ethers, glycol ethers, hydrofluoroethers, esters, ketones, aldehydes, lactones, terpenes, pyrrolidones, and mixtures of two or more thereof.

The aliphatic and aromatic hydrocarbons include naphtha, mineral spirits, alkenes of about 5 to about 20 carbon atoms (e.g., pentene, hexenes, octenes, and the like), toluene, xylenes, mono-, di-, tri-, and tetra-alkyl benzenes, naphthalene and alkyl substituted naphthalenes, indane, and mixtures of two or more thereof. In one embodiment, the solvent is a heavy aromatic naphtha solvent described as having a specific gravity of about 0.880-0.910 grams per milliliter (g/ml), a flash point in excess of about 60° C. (140° F.), a boiling point in the range of about 175 to about 220° C. which compositionally can be described as containing about 90% or greater of C9-C15 aromatics compounds.

The alcohols include mono- or polyhydric hydrocarbon-based alcohols such as methanol, ethanol, propanols, butanols, pentanols, hexanols, heptanols, octanols, decanols, and the like. Also included are fatty alcohols and mixtures thereof, including saturated alcohols such as lauryl, myristyl, cetyl, stearyl and behenyl alcohols, and unsaturated alcohols such as palmitoleyl, oleyl and eicosenyl. Higher synthetic monohydric alcohols of the type formed by the Oxo process (e.g., 2-ethylhexanol), by the aldol condensation, or by organoaluminum-catalyzed oligomerization of alpha-olefins (e.g., ethylene), followed by oxidation, may be used. Alicyclic analogs of the above-described alcohols may be used; examples include cyclopentanol, cyclohexanol, cyclododecanol, and the like.

The polyhydroxy compounds include ethylene, propylene, butylene glycols; di-, tri-, tetra-, penta-, hexa- and hepta-ethylene glycols and hydrocarbon-substituted analogs thereof (e.g., 2-ethyl-1,3-trimethylene glycol, neopentyl glycol, etc.), as well as polyoxyalkylene compounds such as diethylene and higher polyethylene glycols, tripropylene glycol, dibutylene glycol, dipentylene glycol, dihexylene glycol and diheptylene glycol, and their monoethers.

The ethers include up to about 20 carbon atoms, and in one embodiment up to about 10 carbon atoms. These include methyl ether, ethyl ether, n-propyl ether, isopropyl ether, n-butyl ether, vinyl ether, allyl ether, anisole, ethyl phenyl ether, diphenyl ether, 1,4-dioxane, tetrahydrofuran, and the like.

The hydrofluoroethers include pentafluorodimethyl ether, tetrafluorodimethyl ether, fluorodimethyl ether, methyl tetrafluoroethyl ether, methyl trifluoroethyl ether, methyl hepta fluoropropyl ether, nonafluorodiethyl ether, methylhexafluoropropyl ether, methoxy nonafluorobutene, ethoxy nonafluorobutene, and the like.

The glycol ethers include ethylene glycol monomethyl ether, ethylene glycol monomethyl ether acetate, ethylene glycol monoethyl ether, ethylene glycol monoethyl ether acetate, ethylene glycol monopropyl ether, ethylene glycol monobutyl ether, ethylene glycol dimethyl ether, ethylene glycol diethyl ether, diethylene glycol, diethylene glycol monomethyl ether, diethylene glycol monoethyl ether acetate, diethylene glycol monobutyl ether, diethylene glycol dimethyl ether, triethylene glycol dimethyl ether, propylene glycol monomethyl ether, propylene glycol monomethyl ether acetate, dipropylene glycol, dipropylene glycol monomethyl ether, and the like. In one embodiment, the solvent is diethylene glycol monobutyl ether.

The esters include monoesters, dibasic esters and the like. The monoesters may contain up to about 20 carbon atoms, and in one embodiment up to about 10 carbon atoms. These esters include other functional groups in the compound. For example, the monoesters may include ether groups such as methyl, ethyl, propyl or butyl ether groups. The monoesters may include alkyl acetates of oxo alcohols. Examples of the monoesters that may be used include ethyl acetate, propyl acetate, butyl acetate, ethyl-3-ethoxy-propionate, propylene glycol methyl ether acetate, propylene glycol butyl ether acetate, dipropylene glycol methyl ether acetate, dipropylene glycol butyl ether acetate. Lactate esters may be used. Cyclic esters, or lactones, may also be used, such as butyrolactone.

The dibasic esters include dialkyl esters wherein each alkyl group independently has 1 to about 6 carbon atoms, of an aliphatic dibasic acid having 2 to about 10 carbon atoms. In one embodiment, the dibasic ester is a dialkyl ester, wherein each alkyl group independently has 1 to about 4 carbon atoms, of an aliphatic dibasic acid having 2 to about 6 carbon atoms. Examples of the dibasic acids include adipic acid, glutaric acid, succinic acid, and the like. Examples of the dibasic esters include dimethyl glutarate, dimethyl adipate, and the like.

The aldehydes and ketones include aldehydes and ketones of up to about 20 carbon atoms, and in one embodiment up to about 10 carbon atoms. These include formaldehyde, acetaldehyde, propionaldehyde, n-butyraldehyde, n-valeraldehyde, caproaldehyde, heptaldehyde, phenylacetaldehyde, benzaldehyde, o-tolualdehyde, m-tolualdehyde, p-tolualdehyde, salicylaldehyde, p-hydroxybenzaldehyde, acetone, acetophenone, dimethyl ketone, diethyl ketone, methyl ethyl ketone, dipropyl ketone, 2-propanone, cyclohexanone, diphenyl ketone, methyl butyl ketone, methyl isobutyl ketone, methyl amyl ketone, methyl hexyl ketone, methyl phenyl ketone, and mixtures of two or more thereof.

The terpenes include the various isomeric terpene hydrocarbons having the empirical formula $C_{10}H_{16}$, such as contained in turpentine, pine oil and dipentenes, and the various synthetic and naturally occurring oxygen-containing derivatives. Mixtures of these various compounds generally may be utilized, especially when natural products such as pine oil and turpentine are used. Pine oil, for example, which is obtained by destructive distillation of-waste pine wood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other mono-terpene hydrocarbons. The specific ratios and amounts of the various components in a given pine oil will depend upon the particular source and the degree of purification. Pine oil products generally known as terpene alcohols available from Hercules may be used. Examples of such products include alpha-Terpineol containing about 95-97% of alpha-Terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60-65 weight percent of alpha-terpineol and 15-20% beta-terpineol, and 18-20% of other tertiary terpene alcohols. Other mixtures and grades of useful pine oil products also are available from Hercules under such designations as Yarmor 302, Herco pine oil, Yarmor 302W, Yarmor F and Yarmor 60.

The pyrrolidones include N-methylpyrrolidone.

In one embodiment, the solvent (A) includes naphtha; heavy aromatic naphtha; mineral spirits; turpentine; toluene; xylene; methylene chloride; C9-C15 aromatic compounds; acetone; methyl ethyl ketone; N-methyl pyrrolidone; dimethyl glutarate; dimethyl adipate; diethylene glycol monobutyl ether and mixtures of two or more thereof. In one embodiment, heavy aromatic naphtha is used in combination with diethylene glycol monobutyl ether.

The total amount of solvent (A) present in the oil-in-water emulsion remover is at a concentration of about 1 to about 99% by weight of the emulsified composition, and in one embodiment about 20 to about 80% by weight of the emulsified composition, and in one embodiment about 25% to about 60% by weight of the emulsified composition, and in one embodiment about 25% to 45% by weight of the emulsified composition. In one embodiment, heavy aromatic naphtha is present in about 20 to about 40% by weight of the emulsified composition. In one embodiment, diethylene glycol monobutyl ether is present in 2 to about 20% of the emulsified composition and in one embodiment at about 4 to about 10% of the emulsified composition. The solvent may be used alone or in combination of solvents.

The Water (B)

The water may be taken from any convenient source. The water includes tap, deionized, purified using reverse osmosis or distillation, distilled and the like. The water may be used alone or in combination of water.

The water is present in the oil-in-water emulsion remover at a concentration of about 1 to about 99% by weight of the emulsified composition, and in one embodiment about 15 to about 75% by weight of the emulsified composition, and in one embodiment about 30 to about 60% by weight of the emulsified composition.

The Surfactant (C)

The surfactant (C) functions as an emulsifier and may be referred to as an emulsifier. The surfactant (C), includes ethoxylated alcohols, ethoxylated fatty acids, esters, ethoxylated fatty acid esters; sorbitan esters, ethoxylated sorbitan esters, ammonium carboxylate salts, metallic carboxylate salts, alkylarylsulfonates, amine oxides, ethoxylated amines and amides, ethoxylated fatty acids, ethoxylated fatty esters and oils, fatty esters, fatty acid amides, ethylene oxide/propylene oxide copolymers, ethoxylated glycerol esters, ethoxylated glycol esters, imidazoline derivatives, lecithin and derivatives, lignin and derivatives, monoglycerides and derivatives, olefin sulfonates, phosphate esters and derivatives, alkyl sulfates, alkyl ether sulfates, sulfonates of dodecyl and tridecyl benzenes, sulfonates of alkyl naphthalenes, sulfosuccinates and derivatives, tridecyl and dodecyl benzene sulfonic acids, and mixtures thereof. In one embodiment, the surfactant (C) is oleyl alcohol 20-ethoxylate. In another embodiment, the surfactant C is dodecyl alcohol 12-15 ethoxylate. In another embodiment, the surfactant C is octyl alcohol 9-11 ethoxylate.

The surfactant (C) includes an ionic or nonionic compound having a hydrophilic lipophilic balance (HLB) in the range of about 1 to about 40, and in one embodiment about 5 to about 25, and in one embodiment about 10 to about 20. These include cationic and amphoteric surfactants. Examples of these compounds are disclosed in *McCutcheon's Surfactants and Detergents*, 1998, North American & International Edition. Pages 1-235 of the North American Edition and pages 1-199 of the International Edition are incorporated herein by reference for their disclosure of such ionic and nonionic compounds.

The surfactant is used in the oil-in-water emulsion remover at about 0.1 to about 10%, in one embodiment at about 0.2 to about 5% and in one embodiment from about 0.5 to about 3%. The surfactant (C) may be used alone or in combination of surfactants.

Rheology Control Agent/Thickener

The oil-in-water emulsion remover contains one or more rheology control agents or thickener.

Thickeners for use in the aqueous phase include gums, such as xanthan gum, cellulosics, starches; silicates, magnesium aluminum silicates, hydroxyethylcellulose (such as the commercial product Natrosol cellulose or Cellosize), hydroxypropylcellulose (such as the commercial product Klucel), xanthan gums (such as the commercial product Rhodicare CFT from Rhodia), glucose-mannose polysaccharides, such as N-hance HP40 or N-hance HP40S, galactose-mannose polysaccharides such as Cassia gum, ammonium poly (acryldimethyltauramide/co-vinylformamide), also referred to as AMPS/VIFA copolymer, available commercially from Clariant Corporation, Charlotte, N.C. under the name trade name Aristoflex AVC; stearyl alcohol, cetyl alcohol, cetearyl alcohol, and various clays, such as hectorites, smectites and bentonites.

In one embodiment, the oil-in-water emulsified composition is substantially free of a 'high viscosity' xanthan gum that gives a viscosity of about 3,500 to about 25,000 mPa·sec at about 0.5% in water. In another embodiment the oil-in-water composition is free of a 'high viscosity' xanthan gum that gives a viscosity of about 3,500 to 25,000 mPa-sec at about 0.5% in water.

Thickeners further include crosslinked polyacrylic acid copolymers such as Carbopol® ETD 2020 available from Noveon, Inc., modified crosslinked polyacrylate polymers such as Carbopol® Ultrez available from Noveon, Inc., starch, modified potato starch such as Structure® XL, Structure® ZEA available from National Starch and the like.

In one embodiment, the preferred thickener is a synthetic hectorite clay such as the material commercially available from the Sud Chemie Group known as Optigel® SH. In another embodiment, the preferred thickener is a magnesium aluminum silicate, or smectite clay, such as the material commercially available from Southern Clay Product known as Gel White® MAS 100(SC).

The concentration of the thickener in the oil-in-water emulsion remover may be up to about 5% by weight of the emulsified composition, and in one embodiment about 0.1 to about 3% by weight of the emulsified composition. The thickeners may be used alone or in combination.

Base

The oil-in-water emulsion remover contains a base of which functions to assist the solvent (A) in softening or dissolving the coating, wax and/or grease. The base includes an ammonium or an alkali or alkaline earth metal hydroxide, oxide, aluminate, borate or metasilicate. The base further includes ammonium hydroxide, sodium hydroxide, potassium hydroxide, lithium hydroxide, calcium hydroxide, sodium aluminate, sodium borate, sodium metasilicate, potassium metasilicate, and the like. The base includes weak bases such as sodium acetate, sodium carbonate, sodium bicarbonate, potassium carbonate, combinations thereof and the like. In one embodiment, the base is potassium hydroxide. In another embodiment, the base is sodium acetate. In another embodiment, the base is sodium carbonate.

The bases may also include monoamines that have only one amine functionality and polyamines, which have two or more amine functionalities. The amines can be primary, secondary or tertiary amines. The primary amines are characterized by the presence of at least one —$NH_2$ group; the secondary by the presence of at least one H—N< group. The tertiary amines are analogous to the primary and secondary amines with the exception that the hydrogen atoms in the —$NH_2$ or H—N< groups are replaced by hydrocarbyl groups. Examples of primary and secondary monoamines include ethylamine, diethylamine, n-butylamine, di-n-butylamine, isobutylamine, cocoamine, stearylamine, laurylamine, methyllaurylamine, oleylamine, N-methyloctylamine, dodecylamine, and octadecylamine. Suitable examples of tertiary monoamines include trimethylamine, triethylamine, tripropyl amine, tributylamine, monoethyl dimethylamine, dimethylpropyl amine, dimethylbutyl amine, dimethylpentyl amine, dimethylhexyl amine, dimethylheptyl amine, and dimethyloctyl amine.

In one embodiment, the amines are hydroxyamines. These hydroxyamines can be primary, secondary, or tertiary amines. Typically, the hydroxyamines are primary, secondary or tertiary alkanolamines, or mixture thereof. Such amines can be represented, respectively, by the formulae:

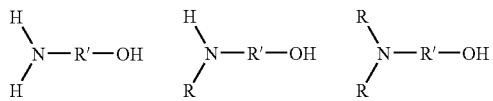

and mixtures of two or more thereof; wherein in the above formulae each R is independently a hydrocarbyl group of 1 to about 8 carbon atoms, or a hydroxyl-substituted hydrocarbyl group of 2 to about 8 carbon atoms and each R' independently is a hydrocarbylene (i.e., a divalent hydrocarbyl) group of 2 to about 18 carbon atoms. The group —R'—OH in such formulae represents the hydroxyl-substituted hydrocarbylene group. R' can be an acyclic, alicyclic, or aromatic group. Typically, R' is an acyclic straight or branched alkylene group such as ethylene, 1,2-propylene, 1,2-butylene, 1,2-octadecylene, etc. group. When two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is independently a lower alkyl group of up to seven carbon atoms.

Suitable examples of the hydroxyamines include mono-, di-, and triethanolamine, dimethylethanolamine(N,N-dimethylethanolamine), diethylethanolamine(N,N-diethylethanolamine), di-(3-hydroxylpropyl)amine, N-(3-hydroxylbutyl)amine, N-(4-hydroxylbutyl)amine, N,N-di-(2-hydroxylpropyl) amine, combinations thereof and the like. In one embodiment, the base is dimethylethanolamine. In another embodiment, the base is triethanolamine.

Examples of the amines used in the emulsions can be polyamines as disclosed in U.S. Pat. No. 4,234,435 at column 21, line 4 to column 27, line 50. They may also be heterocyclic polyamines or alkylenepolyamines. Alkylenepolyamines are represented by the formula H(R$^1$)N-(Alkylene-N(R$^1$))$_n$R$^1$, where each R$^1$ is independently hydrogen or an aliphatic group or a hydroxy-substituted aliphatic group; n is 1 to 10, 2 to 7, or 2 to 5, and the "Alkylene" group has 1 to 10, or 2 to 6, or 2 to 4 carbon atoms. Specific examples of such polyamines are the ethyleneamines and polyethyleneamines, such as ethylenediamine, diethylenetriamine, triethylenetetramine, tetraethylenepentamine, pentaethylenehexamine and mixtures thereof, including complex commercial mixtures which include cyclic condensation products. Such materials are described in detail under the heading "Ethylene Amines" in Kirk Othmer's Encyclopedia of Chemical Technology, 2d Edition, Vol. 7, pages 22-37, Interscience Publishers, New York, 1965.

Other amine mixtures include "polyamine bottoms" which is the residue resulting from stripping of the above-described polyamine mixture. In another embodiment, the polyamine can be a condensed polyamine resulting form the condensation reaction of at least one hydroxy compound with at least one polyamine reactant containing at least one primary or secondary amino group. Such condensates are described in U.S. Pat. No. 5,230,714. Similarly, amines can be amino alcohols of any of a variety of well-known types. In one embodiment, the base is a polyethylenepolyamine mixture enriched in triethylenetetramine. In another embodiment, the base is a polyethylenepolyamine mixture enriched in tetraethylenepentamine. In another embodiment, the base is a polyethylenepolyamine mixture enriched in pentaethylenehexamine.

The base is present in the oil-in-water emulsion remover at a concentration of up to about 60% by weight based on the weight of the water in the oil-in-water emulsion, and in one embodiment from about 0.1 to about 60% by weight, and in one embodiment from about 0.5 to about 50% by weight, and in one embodiment from about 0.5 to about 20% by weight, and in one embodiment from about 0.5 to about 10% by weight of the water. The base may be used alone or in combination.

Additional Additives

The oil-in-water emulsion remover may optionally contain one or more of an antimisting agent, odor suppressant, corrosion inhibitor, coloring agent, antifreeze agent, demulsifier, biocide, and the like. The concentration of each of these additional additives may be independently up to about 10% by weight of the emulsified composition. Specific examples of the additional additives are known in the art for use in metalworking and other industrial applications. For example, antimisting agents include polymers like polyethylene glycols, polysaccharide gums, and copolymers of 2-acrylamido-2-methylpropane sulfonic acid, sodium salt (NaAMPS) with acrylamide and substituted acrylamides; corrosion inhibitors include fatty acid derived alkanolamides, fatty acid derived imidazolines, metal and amine salts of organic acids, benzotriazole and tolyltriazole; odor masks include natural or synthetic aromatic compounds; antifreeze agents include methanol, ethanol, ethylene glycol and propylene glycol; demulsifiers include polyethylene glycols, polyethylene oxides, polypropylene oxides, (ethylene oxide-propylene oxide) polymers, polyoxyalkylene alcohols, alkyl amines, amino alcohols, diamines or polyamines reacted sequentially with ethylene oxide or substituted ethylene oxide mixtures, trialkyl phosphates, and mixtures thereof; antifungals include sodium omadine; antimicrobials and preservatives include triazines, sodium omadine, zinc omadine, oxizolidines and imidazoliones.

Process for Forming the Oil-in-water Emulsion

The solvent (A), water (B), surfactant (C), thickener (D), base (E) and optionally additional additives are mixed under appropriate mixing conditions to form the desired oil-in-water emulsion composition. The mixing includes high shear mixing, low shear mixing, or a combination thereof. The mixing may be conducted using a single mixing step or in the alternative multiple mixing steps. The mixing may be conducted on a batch basis, a continuous basis, or a combination thereof. The shear rate for the mixing may be up to about 500,000 sec$^{-1}$, and in one embodiment about 20,000 to about 200,000 sec$^{-1}$, and in one embodiment about 25,000 to about 120,000 sec$^{-1}$. The mixing is conducted at a temperature in the range of about 0° C. to about 100° C., and in one embodiment about 10° C. to about 50° C. The mixing occurs generally in the range from about 1 minute to about 30 hours and in another embodiment in the range from about 5 minutes to about 25 hours and in another embodiment in the range from about 8 minutes to about 20 hours.

Coatings that Can be Removed

The coatings that can be removed include any non-aqueous or aqueous based coatings and mixtures thereof. Further the coatings that can be removed include any pigmented or non-pigmented paint or primer for paint or clear coat or base coat paint or coating or mixtures there of that has been applied to a substrate. These include paint, varnish, lacquer and the like. The coatings may include one or more binders or resins, one or more pigments and combinations thereof. The term "non-aqueous" is used herein to refer to a coating that is to be removed which is either in the form of a dry film wherein the solvent (i.e., organic or aqueous solvent) has evaporated, or in the form of a coating that is liquid or only partially dried and is non-aqueous.

The binder or resin may be any binder or resin conventionally used in coatings. The binder may be a thermoplastic or a thermosetting resin. The binder may be an alkyl-based binder or a latex binder. The binder may be a synthetic resin or a natural resin. Examples include acrylic resins, vinyl resins, polyester resins, alkyd resins, butadiene resins, styrene resins, phthalic acid resins, urethane resins, epoxy resins, and the like. The binder may comprise vinyl or vinylidene polymers or copolymers containing units such as vinyl acetate, vinyl chloride, vinylidene chloride, and the like; hydrocarbon polymers and copolymers containing ethylene or propylene units and oxygenated or halogenated derivatives of ether, butadiene, oxygenated butadiene, isoprene, oxygenated isoprene, butadiene-styrene, butadiene vinyl toluene, isoprene-styrene and the like; polymers or copolymers containing units of acrylic acid, methacrylic acid, their esters, or acrylonitrile; vinylic hydrocarbon monomers reacted with unsaturated materials such as the reaction product of maleic acid or anhydride with styrene; and, broadly, various other resinous rubber-like elastomeric latex polymers and copolymers of ethylenically unsaturated monomers and polymers obtainable in stable aqueous latex form. The binder may comprise a copolymer of vinyl chloride and vinyl acetate. The binders include diphenylmethane diisocyanate, methylene diethyl diisocyanate, isocyanurate, urea-formaldehyde, phenolformaldehyde, phenolic glue, animal hide glues, and the like. Other examples of binders or resins which can be used include fluorine resins, silicone resins, and fibrin resins.

The pigments include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, woloastonite wood flour, barium sulfate, calcium carbonate, aluminum silicate, and the like can be added as well in conventional amounts traditionally used in coating and paint formulations.

Waxes that Can be Removed

The waxes that can be removed include insect waxes, animal waxes, vegetable waxes, mineral waxes, synthetic waxes, and the like. Insect and animal waxes include beeswax, spermaceti and the like. Vegetable waxes include carnauba, candelilla, Japan wax, ouricury wax, rice bran wax, jojoba, castor wax, bayberry wax and the like. Mineral waxes include montan, peat waxes, ozokerite and ceresin, petroleum waxes and the like. Synthetic waxes include polyethylene waxes, Fischer-Tropsch waxes, chemically modified waxes, substituted amide waxes, polymerized $\alpha$-olefins and the like.

Greases that Can be Removed

The greases that can be removed include any lubricating oil that has been thickened with a thickening agent. The oils include natural and synthetic oils including petroleum oils and the like. The thickeners include fatty acid soaps of lithium, calcium, aluminum and the like. Finely divided clay particles of the bentonite and hectorite types may be used as grease thickeners after being coated with an organic material such as quaternary ammonium compounds. Several other nonsoap powders that are used as thickeners in grease include silica gel, graphite, polyurea powders and the like.

Process for Removing Coatings, Waxes and Greases

The substrate from which the coating, wax, grease or combinations thereof may be removed may be any substrate to which the coating, wax or grease has been applied. The substrate includes natural materials, wood, metal, glass, plastic, wall board, composites, synthetic naturals and the like.

The conditions under which the coating, wax and/or grease removal process may be practiced may vary, depending on the conditions of the substrate, coating, wax and/or grease. In one embodiment, the process is conducted under ambient atmospheric conditions. The temperature for the process is in the range in one embodiment about $-20°$ C. to about 50° C., and in another embodiment about 10° C. to about 40° C., (although higher or lower temperatures may be used). The oil-in-water emulsion composition may be applied to the substrate using any convenient method such as by dipping, spraying, brushing and the like the emulsion remover onto the coating, wax or grease. The coating, wax and/or grease softens/dissolves over time. Thereafter the dissolved coating wax and/or grease is removed using known techniques. It may be desirable to use a rag, scraper, sand blaster, or the like, to remove the coating chips from the substrate after the oil-in-water emulsion composition has been given time to soften or dissolve the coating. Alternatively, in another embodiment, a high pressure water spray may be employed to remove coating chips.

In one embodiment, the emulsified remover is used on a coating such as a paint which then blisters or bubbles to permit removal. In another embodiment, the coating appears to dissolve and can be removed with a stream of water. In one embodiment, for resistant coated substrates, it is desirable to apply the oil-in-water emulsion remover two or more times to fully separate the coating from the substrate.

The time required for the oil-in-water emulsion remover to act upon the substrate may vary due to a variety of factors such as temperature, coating type, the particular emulsion composition being used and the like. The application times may vary in the range of about one minute to about greater than one hour and in another embodiment about two minutes to about one hour, and in another embodiment about 5 minutes to about 30 minutes, although shorter or longer application times may be used. In one embodiment the oil-in-water emulsified remover may be applied once to remove the coating, in another embodiment it may be applied up to two times and in another embodiment it may be applied three times.

In one embodiment, the inventive oil-in-water emulsified remover may be used to clean paint systems used in mass assembly operations. Paint systems used in mass assembly operations such as the automotive and appliance industries generally rely on a central supply depot from which paint is passed through paint lines to stationary paint stations located within an enclosed paint booth. The parts are painted as they pass through paint booths on a moving conveyor. An example of such a system is disclosed in U.S. Pat. No. 5,019,138, which is incorporated herein by reference. Because the system uses several tanks, valves, pumps, bypass lines and the like, a variety of paints or coatings can be delivered to a given paint station over common lines. The oil-in-water emulsion remover may be used to clean the central supply depot, paint lines, paint stations, spray nozzles, fixtures, walls, robots, floor grating, paint booths, and the like, used in these systems. This may be affected by spraying the control supply depot, paint stations, fixtures, walls, robots, floor grating, paint booths, and the like, with the oil-in-water emulsion remover, and flushing with what the resulting mixture of emulsion and paint or coating down an appropriate drain. The oil-in-water emulsion composition may be used to clean the paint lines and spray nozzles by flowing the emulsion remover through the paint lines and spray nozzles.

EXAMPLES

The following oil-in-water emulsion compositions are blended in an IKA Works Ultra-Turrax, Model T25 homogenizer using high shear mixing for about 5 minutes at ambient temperature. In the following table, all numerical values are in parts by weight.

The oil-in-water emulsion compositions in the above examples are oil-in-water emulsions characterized by a discontinuous organic or oil phase, and a continuous aqueous phase The efficacy of these emulsion compositions has been demonstrated through the following examples:

Example A

A waterborne red coating was applied to a stainless steel panel and the coating was allowed to air dry for approximately six hours. The coated panel was then oriented at about a 60° angle with respect to the benchtop. Emulsion composition 4 from Table 1 was applied to the panel and allowed to sit for 20 minutes. The panel was then rinsed with tap water for 30-60 seconds. The panel was then visually rated for paint and pigment removal, indicating that all of the paint was removed and essentially all of the pigment was removed.

Example B

A solvent borne white coating was applied to a stainless steel panel and the coating was allowed to air dry for approximately six hours. The coated panel was then oriented at about a 60° angle with respect to the benchtop. Emulsion composition 2 from Table 1 was applied to the panel and allowed to sit for 20 minutes. The panel was then rinsed with tap water for 30-60 seconds. The panel was then visually rated for paint and pigment removal, indicating that all of the paint was removed and essentially all of the pigment was removed.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

TABLE I

| | Example | | | | | | | |
|---|---|---|---|---|---|---|---|---|
| | 1 | 2 | 3 | 4 | 5 | 6 | 7 | 8 |
| Aromatic solvent having specific gravity of 0.880-0.910 g/mL a flash point in excess of 60 C., b.p. between 175-220 C. | 51.9 | 31.4 | 30.6 | 30.5 | 30.4 | 30.4 | 30.4 | 42.7 |
| diethylene glycol monobutyl ether | 5.0 | 5.0 | 4.9 | 4.9 | 4.9 | 4.9 | 4.9 | 4.5 |
| Water | 39.2 | 58.0 | 53.4 | 55.6 | 53.3 | 51.7 | 53.7 | 44.7 |
| Oleyl alcohol 20-ethoxylate | 2.5 | 2.5 | 2.5 | 2.5 | 2.5 | 2.5 | 2.5 | 2.27 |
| Potassiuim hydroxide | 1 | 2.00 | — | — | — | — | — | 2.87 |
| Hydroxypropylcellulose | 0.33 | — | — | — | — | — | — | — |
| Xanthan gum | — | 1.00 | 0.60 | — | — | — | 0.60 | — |
| Sodium acetate | — | — | 8.00 | — | — | — | — | — |
| Magnesium aluminum silicate | — | — | — | 2.51 | — | 2.50 | — | 2.93 |
| Hectorite Clay | — | — | — | — | 1.00 | — | — | — |
| Sodium carbonate | — | — | — | 4.00 | — | — | — | — |
| Polyethylenepolyamine | — | — | — | — | 8.00 | — | — | — |
| Dimethylethanolamine | — | — | — | — | — | 8.00 | — | — |
| Triethanolamine | — | — | — | — | — | — | 8.00 | — |

The invention claimed is:

1. An oil-in-water emulsion composition, comprising:
   (A) a solvent selected from the group consisting of naphtha, heavy aromatic naphtha, turpentine, toluene, xylene, methylene chloride, C9-C15 aromatic compounds, acetone, methyl ethyl ketone, N-methyl pyrrolidone, dimethyl glutarate, dimethyl adipate, diethylene glycol monobutyl ether, and mixtures of two or more thereof;
   (B) water;
   (C) at least one surfactant selected from the group consisting of an oleyl alcohol 20-ethoxylate, dodecyl alcohol 12-15 ethoxylate, octyl alcohol 9-11ethoxylate and mixtures thereof;
   (D) at least one thickener selected from the group consisting of a hectorite clay, a smectite clay, and mixtures thereof; and
   (E) at least one base selected from the group consisting of potassium hydroxide, sodium carbonate, potassium acetate, dimethylethanolamine, triethanolamine, a polyamine enriched in triethylene tetramine, a polyamine enriched in tetraethylene pentamine, a polyamine enriched in pentaethylene hexamine and mixtures thereof; resulting in an emulsified remover;
   wherein said oil-in water emulsion composition is characterized by a continuous aqueous phase, and a discontinuous oil or solvent phase and wherein the oil-in-water emulsion composition is characterized by a dispersed oil phase comprising droplets having a mean diameter of about 0.05 to about 50 microns; and wherein said emulsion composition removes aqueous coatings, non-aqueous coatings, waxes and greases from substrates that such material is applied to;
   and wherein the solvent is present in the oil-in-water emulsion remover at a concentration in the range of about 20 to about 80% by weight of the emulsified composition, wherein the water is present in the oil-in-water emulsion remover at a concentration in the range from about 15 to about 75% by weight of the emulsified composition, wherein the concentration of the surfactant in the oil-in-water emulsion composition in the range from about 0.1 to about 10% by weight of the emulsified composition, wherein the thickener is present in the oil-in-water emulsion remover in a concentration up to about 5% by weight of the emulsified composition, and wherein the base is present in the oil-in-water emulsion remover at a concentration of up to about 60% by weight based on the weight of the water in the oil-in-water emulsion.

2. The composition of claim 1 further including at least one additive selected from the group consisting of antimisting agents, odor masks, corrosion inhibitors, coloring agents, antifungal agents, antimicrobial agents, antifreeze agents, and combinations thereof.

3. The composition of claim 1 wherein the oil-in-water emulsion composition has a Brookfield viscosity using a No. 3 spindle at 10 rpm up to about 100,000 centipose (cP) at 25° C.

4. The composition of claim 1 wherein the total amount of solvent (A) present in the oil-in-water emulsion remover is selected from the group consisting of a concentration of, about 25% to about 60% by weight of the emulsified composition, and about 25% to about 45% by weight of the emulsified composition.

5. The composition of claim 1 wherein the solvent is selected from the group consisting of at least one of a heavy aromatic naphtha present in about 20 to about 40% by weight of the emulsified composition, a diethylene glycol monobutyl ether present in 2 to about 20% of the emulsified composition and combinations thereof.

6. The composition of claim 2 wherein the concentration of each of the additives may be independently up to about 10% by weight of the emulsified composition.

7. The composition of claim 1 wherein the oil-in-water emulsified composition is substantially free of a high viscosity xanthan gum.

8. The composition of claim 2 wherein one or more additives are selected from 1.) the antimisting agents selected from the group consisting of polyethylene glycol, polysaccharide gums, and copolymers of 2-acrylamido-2-methylpropane sulfonic acid, sodium salt (NaAMPS) with acrylamide and substituted acrylamides and combinations thereof; 2.) corrosion inhibitors selected from the group consisting of fatty acid derived alkanolamide, fatty acid derived imidazolines, metal and amine salts of organic acids, benzotriazole and tolyltriazole; odor masks include natural or synthetic aromatic compounds and combinations thereof; 3.) antifreeze agents selected from the group consisting of methanol, ethanol, ethylene glycol and propylene glycol and combination thereof; 4.) demulsifiers selected from the group consisting of polyethylene glycol, polyethylene oxides, polypropylene alcohol oxides (ethylene oxide-propylene oxide) polymers, polyoxyalkylene alcohol, alkyl amines, amino alcohol, diamines or polyamines reacted sequentially with ethylene oxide or substituted ethylene oxide mixtures, trialkyl phosphates, and combinations thereof; 5.) antifungals selected from the group consisting of sodium omadine and combination thereof; 6.) antimicrobials and preservatives selected from the group consisting of triazines, sodium omadine, zinc omadine, oxizolidines and imidazolines and combinations thereof; and 7.) combinations thereof.

9. A process to make the composition of claim 1 by mixing the solvent water, surfactant, thickener, base and optional additional additives under appropriate mixing conditions selected from the group consisting of high shear mixing, low shear mixing, or a combination thereof at a temperature in the range of about 0° C., to about 100° C., and for about 5 minutes to about 20 hours to form the desired oil-in-water emulsion composition.

10. The process of claim 9 wherein the mixing is at a shear rate for the mixing may be up to about 500,000 sec$^{-1}$.

* * * * *